United States Patent [19]

Durham

[11] Patent Number: 4,645,605

[45] Date of Patent: Feb. 24, 1987

[54] FILTRATION WITH BIOGENETIC SILICA

[75] Inventor: Robert L. Durham, Simonton, Tex.

[73] Assignee: Agritec, Inc., Houston, Tex.

[21] Appl. No.: 630,482

[22] Filed: Jul. 13, 1984

[51] Int. Cl.$^4$ .................. B01D 15/00; B01D 53/04
[52] U.S. Cl. .................................... 210/679; 55/29;
 55/98; 55/387; 55/522; 55/524; 210/689;
 210/807; 210/282; 210/484; 210/502.1;
 210/506
[58] Field of Search ............... 55/29, 98, 99, 387,
 55/515, 522, 524; 210/689, 807, 484, 500.1,
 501–510.1, 282, 679, 694

[56] References Cited

U.S. PATENT DOCUMENTS

| | | | |
|---|---|---|---|
| 2,892,240 | 6/1959 | Frankenhoff | 210/500.1 |
| 3,889,608 | 6/1975 | Pitt | 110/216 |
| 3,959,007 | 5/1976 | Pitt | 431/173 |
| 4,105,459 | 8/1978 | Mehta | 106/89 |
| 4,460,292 | 7/1984 | Durham et al. | 405/129 |

Primary Examiner—Ivars Cintins
Attorney, Agent, or Firm—Fulbright & Jaworski

[57] ABSTRACT

Disclosed is the filtration of fluids by utilizing porous biogenetic silica ash devoid of fiber alone or combined with additives. The biogenetic silica may be in particles or prilled or pelleted. Solid particles and liquids are filtered from gases and liquids by passing them through the biogenetic silica. The additives are materials which attract the impurities into the pores of the biogenetic silica, such as water-swellable polymers or carbon remaining on the biogenetic silica when incompletely pyrolyzed. The carbon can be activated.

23 Claims, 4 Drawing Figures

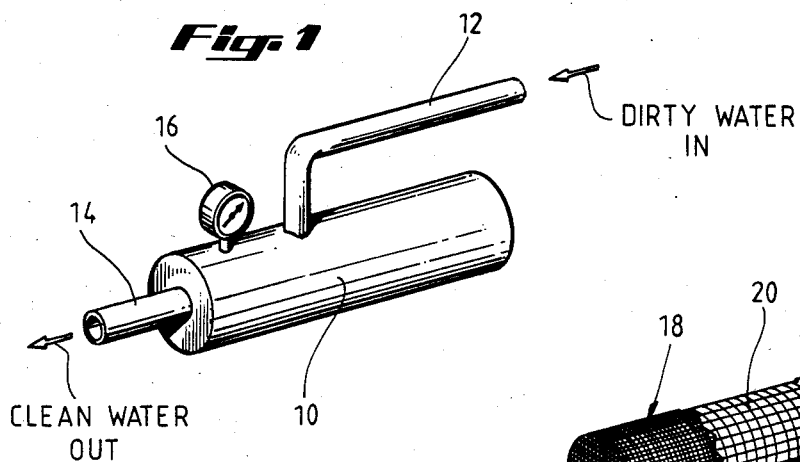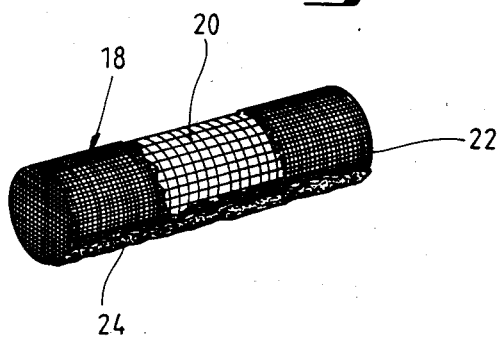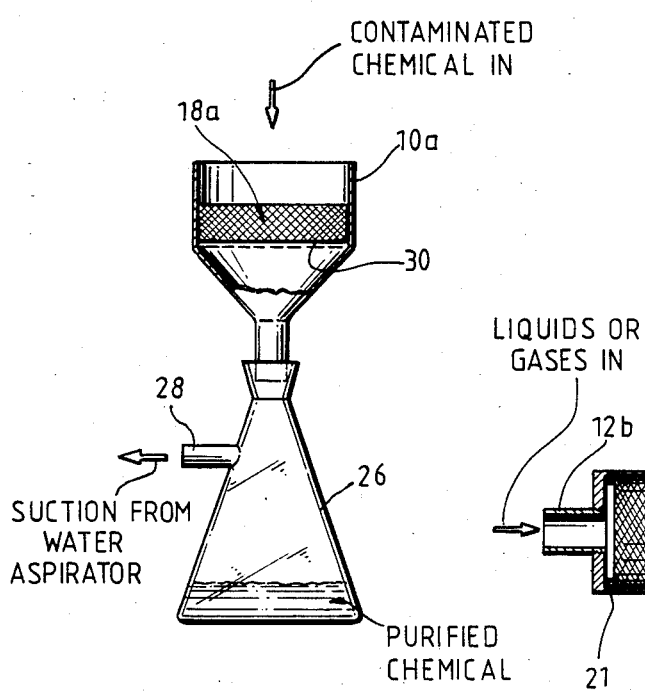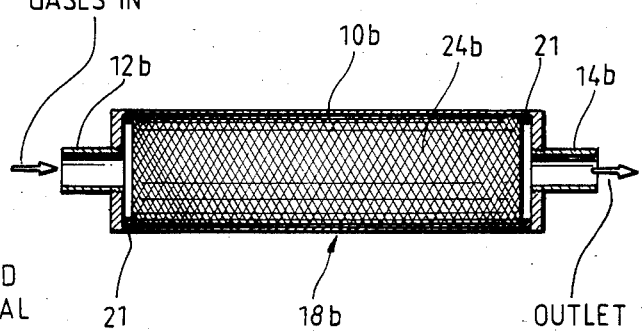

FILTRATION WITH BIOGENETIC SILICA

FIELD OF THE INVENTION

The present invention relates to the removal of impurities from a fluid by passing the fluid through a filter bed comprised of porous biogenetic silica alone or containing additives.

BACKGROUND OF THE INVENTION

Filtration is a well known method to separate impurities from liquids or gases. It is generally used to remove solids, but may also be used to separate compounds of various sizes as in the use of molecular sieves. Systems are available that combine preferential absorption along with the physical separation of particles occurring in filtration. For example, it is well known that activated carbon may be used to extract a broad range of chemicals from liquids. Thus, when it is added to a filter media, particles of various sizes that are too large to pass through the filter media are separated and also certain materials that are absorbed by the carbon as a component of the total media are removed.

These materials are what might be called active particles in that they improve the separation through absorption or some other method. In many filtration processes, it is desirable to have these particles built into the filter medium. When used alone, most of these form density packed beds making it impossible to use them in performing continuous filtration of liquid streams. Therefore, it is desirable to have this type material in small quantities in a dispersed state for most effective use.

Aggregates used as the principal filtering substance must have certain physical properties. These are:
1. Good porosity.
2. Pore sizes sufficient to allow the desired material to pass through yet prevent the undesirable material from passing through.
3. They should not readily compact.
4. They should not form a sticky mass like clays when wet.
5. They should be dimentionally stable at the temperature and pressure range where the filtration occurs.

It would be highly desirable to have an aggregate with all of the above properties. It would be further advantageous to also have a material with a small percentage of active particulates uniformly dispersed throughout the filter medium, such as activated carbon or water-swellable polymers providing additional filtering properties that are highly useful in many filtration processes.

SUMMARY

The present invention is directed to a filter medium and method of filtering by which the above properties are obtained and, if desired, active particulates are uniformly dispersed throughout the filter medium. Advantageously, the filter medium can be produced by the pyrolysis or burning of plants containing large amounts of silica, that is, having a minimum of 15 percent silica by weight in the dry matter and preferably 20 percent or more which leaves an ash that is high in silica (biogenetic silica) and, if desired, a small amount of carbon uniformly dispersed throughout the silica structure. If desired, the carbon can be activated providing the active particulate uniformly dispersed throughout which is highly useful in many filtration processes.

Accordingly, it is an object of the present invention to provide a filter medium having the aforementioned desirable properties.

A further object of the present invention is the provision of a means and a method of filtration which has the aforementioned desirable properties.

A further object of the present invention is the provision of a filter medium comprised of porous biogenetic silica ash having the aforementioned properties.

A further object of the present invention is the provision of a filter medium comprised of rice hull ash in substantially amorphous state having a highly porous skeletal structure.

A further object of the present invention is the provision of a means for and a method of filtering liquids utilizing as the filter medium biogenetic silica ash of high porosity having the aforementioned properties.

A further object of the present invention is the provision of a means for and a method of filtration of liquids utilizing biogenetic silica ash of high porosity having the aforementioned properties and active particulates dispersed throughout.

Other and further objects, features, and advantages appear throughout the specification and claims.

BRIEF DESCRIPTION OF THE DRAWINGS

FIG. 1 is a perspective view of a filter system.

FIG. 1A is a perspective view of a filter cartridge or medium according to the invention used in the filter system of FIG. 1.

FIG. 2 is an elevational view, in cross section, illustrating another form of filter according to the invention.

FIG. 3 is a further modification illustrating a packed filter according to the invention.

DESCRIPTION OF PRESENT AND PREFERRED EMBODIMENTS

As previously mentioned, the present invention is directed to a means for and a method of filtering with a filter medium having good porosity, a pore size sufficient to allow the desired material to pass through yet prevent the undesirable material from passing through, does not readily compact, does not form a sticky mass, such as clays when wet, and is dimensionally stable at the temperature and pressure range that the filtration occurs. This is accomplished by utilizing biogenetic silica devoid of fiber having a porosity of at least 50 percent by volume, either alone or with active particulates dispersed throughout.

To form an effective, highly porous silica structure, plants are burned which contain a minimum of 15 percent silica by weight in its dry matter and preferably 20 percent or more. There are a limited number of such plants that contain these high quantities of silica. Essentially, these are the stalks and hulls of rice, equisetum (horsetail weeds), certain bamboos and palm leaves, particularly polymra, pollen, and the like, all of which when burned leave a porous ash that is highly desirable as a filtration medium.

The presently preferred biogenetic silica is rice hull ash. Rice hulls are high in silica content, containing about 18 to 22 percent by weight, with the ash having a porous skeletal silica structure having approximately 75 to 80 percent open or void spaces by volume. In addition, it has been a continuing problem for the rice industry to dispose of rice hulls; and, while a number and variety of uses for rice hulls or rice hull ash have been proposed and used, large volumes of rice hulls are burned; and their ash is disposed by the rice industry as a waste material at great expense.

Biogenetic silica in amorphous state and in substantially porous form can be obtained either by burning or decomposition of the hulls.

Commercially available rice hull ash is prepared by burning rice hulls in a furnace. In the process, raw rice hulls are continually added to the top of the furnace and the ash is continuously removed from the bottom. Temperatures in the furnace range from 800° to about 1400° C., and the time factor for the ash in the furnace is about three minutes. Upon leaving the furnace, the ash is rapidly cooled to provide ease in handling. When treated by this method, silica remains in a relatively pure amorphous state rather than the crystalline forms known as tridymite or crystobalite. This transition from the amorphous to the crystalline state generally takes place when the silica is held at very high temperatures, for example 2000° C., or longer periods of time. The significance of having the silica in an amorphous state is that the silica ash maintains a porous skeletal structure rather than migrating to form crystals, and the amorphous form of silica does not cause silicosis thus reducing cautionary handling procedures. The burning of the rice hulls is time-temperature related, and burning of these hulls under other conditions can be done so long as the ash is in an amorphous state with a porous skeletal structure.

The amount of open or void spaces in the biogenetic silica ash depends on the amount of fines in the ash. The inclusion of fines is not deleterious; however, the more porous the ash the better.

Biogenetic silica devoid of fiber is fire-retardant, inert, and is dimensionally stable at low and high temperatures, thus rendering it useful at elevated temperatures without structural change.

On a commercial burning of rice hulls as an energy source, the resultant ash had the following chemical analysis (by weight):

Silicon—92 percent
Magnesium—2.0 percent
Moisture—3.0 percent
Carbon—2.5 percent The remaining ½ percent consists of minor amounts of magnesium, barium, potassium, iron, aluminum, calcium, copper, nickel, and sodium.

The carbon content was in a dispersed state throughout the material. To activate the carbon, the ash was treated with super heated steam under standard conditions. This treatment removes particles that clog the pores of the carbon thus enormously increasing the ability of the carbon to absorb gases.

If desired, of course, the rice hull ash can be burned until all of the carbon is removed. However, in many filtration processes, the presence of the carbon is highly advantageous.

Referring now to the drawings and particularly to FIGS. 1 and 1A, a typical filtering system is illustrated which includes a filter cartridge container 10, an inlet line 12 for flowing liquid to be filtered into the container 10, and an outlet line 14 for flowing filtered liquid out of the container 10. A conventional pressure gauge 16 is provided which measures the pressure within the container 10.

Disposed within the container 10 is a cylindrical cartridge 18, comprised of a cylinder formed of coarse mesh 20, a fine mesh outer layer 22 upon a biogenetic silica cake is disposed. While not shown, means are provided in the container 10 so that the filter cartridge 18 can be placed in the container, and the container closed except for the inlet and outlet lines 12 and 14, respectively, so that the filter cartridge 18 can be inserted into the container or body 10 for operation and can be removed, cleaned, and replaced or simply replaced.

In operation of the embodiment of FIGS. 1 and 1A, dirty water enters the inlet 12, flows through the cartridge 18, the biogenetic silica 22 filtering out the impurities, and the clean water is discharged out the outlet line 14 for such use as may be desired.

The following Example 1 illustrates the filter system of FIGS. 1 and 1A in which diamataceous earth of a conventional system has been replaced with porous biogenetic silica for the purpose of removing trash particles in a swimming pool filter system.

EXAMPLE 1

A standard swimming pool system utilizing the filter cartridge 18 having an inner core 20 of course fibers and an outer core 22 of fine mesh fibers which in prior systems retain an outer coating 24 of aggregates such as diamataceous earth (DAE) was used. Biogenetic silica (rice hull ash) without additives was used in place of the DAE to form about a ½ inch coating 24 on the outer layer 22.

Dirty water from the pool was then pumped through the input line 12 through the filter cartridge 18 at a rate of about 8 gallons per minute per filter. Pressure reading on the gauge 16 was 10 pounds. The water passing through the filter system was analyzed for solid particles. All solids were removed down to about 1-2 microns in size. The irregular characteristics of the biogenetic silica and the high porosity allowed free passage of the water.

When the pressure built to 40 psig, the filter elements were back flushed and the spent biogenetic silica replaced with fresh biogenetic silica. Since the biogenetic silica does not readily stick together, there was no problem with removal of the spent biogenetic silica cake 24. The process was repeated as required by the amount of trash to be removed.

Referring now to FIG. 2, there is illustrated another embodiment of the invention which comprises a container 10a having a cylindrical filter 18a, which is a typical laboratory filter, and a container 26 provided with a suction line 28 to a conventional water asperator, not shown.

As previously mentioned, the filter 18a is a typical laboratory filter and has a filter paper 30 disposed at its bottom upon which is placed biogenetic silica ash to which is added about 1 percent of a water-swellable polymer.

The following Example 2 illustrates the use of the filter system of FIG. 2 for the removal of minor amounts of moisture in solids from trichloroethylene.

EXAMPLE 2

Trichloroethylene is a fire resisting solvent used extensively in the industrial process. In this Example, the trichloroethylene contains about ½ percent by weight moisture and 1½ percent by weight of chemical solids. The sample was light amber in color and cloudy from the moisture.

The trichloroethylene was poured on top of the filter 18a and sucked through it by water asperation in the suction line 28. The resulting filtered liquid flowed by gravity into the container 26 and was clear, indicating complete removal of the moisture, and was free of solids.

Referring now to FIG. 3, a simple packed tube filter containing biogenetic silica is illustrated, which includes the filter cartridge container body 10b, the inlet 12b, and the outlet 14b from the container body 10a and a tube packed cartridge 18b having the tube shaped mesh 18b with the closed ends 19 disposed in the body 10b and provided with the seals 21 at each end. The tube 18b is packed with the porous biogenetic silica either alone or with a suitable additive, as desired.

A description of the operation of the packed tube filter of FIG. 3 is set forth in connection with the following Example 3 in which moisture and solid particles were removed from a stream of mostly methane gas produced in a commercial gas well.

EXAMPLE 3

In this Example, the in line filter 18b comprised an open tube 18b packed with porous biogenetic silica 24b containing approximately 1 percent by weight of a water soluble swellable polymer, such as in Example 2. The metal filter disc 19 provided at each end of the tube 18b retained the biogenetic silica having the water-swellable polymer dispersed throughout. This filter was used on a slip stream to keep moisture and trash out of gauges used to measure pressure and flow in a gas well. Gases passing through the filter were then checked for moisture and trash and none was detected.

Any water-soluble polymer and any cross-linked polymer whose linear analog is water soluble can be used. Amounts up to 2 percent and more than 1 percent by weight are satisfactory. The presently preferred water-soluble polymer is a starch acrilonitrate graft copolymer. For a description of such polymers, reference is made to U.S. Pat. No. 4,238,374.

EXAMPLE 4

In this Example, absorption and hence removal of methane and ethane gas from an air stream is illustrated.

A synthetic gas was formulated to contain approximately 1 percent methane and 1 percent ethane in air. Porous biogenetic silica containing 3.1 percent carbon by weight was obtained by burning rice hulls in an air deficient atmosphere by setting the rice hulls on fire in a metal container and allowing them to burn for two days. When the rice hulls were reduced to a black ash, the container was sealed off forming a hot box, and the ash was allowed to smolder with only minor amounts of air present for one week. The resulting ash was highly porous biogenetic silica ash in amorphous state containing 3.1 percent carbon by weight. The ash was then placed in a tube and subjected to 60 pounds of steam for six hours which activated the carbon. The steam was replaced with nitrogen gas and the ash allowed to cool down.

The in-line filter 18b in FIG. 3 was packed with this biogenetic silica containing active carbon particles produced by the above-described process. The in-line filter contained ¼ pound of the biogenetic silica having activated carbon as mentioned.

The synthetic gas mixture was then passed through the filter tube 10b at the rate of 10 cubic feet per minute at 74° F. and 10 PSIG. The methane and ethane levels were checked for two hours at 15 minute intervals by gas chromatography with the results as set forth in the following Table 1.

TABLE 1

| Time | Percent Methane | Percent Ethane |
|---|---|---|
| 15 minutes | <0.1 | <0.1 |
| 30 minutes | <0.1 | <0.1 |
| 45 minutes | <0.1 | <0.1 |
| 60 minutes | <0.1 | <0.1 |
| 75 minutes | <0.1 | <0.1 |
| 90 minutes | <0.15 | <0.15 |
| 105 minutes | <0.15 | <0.15 |
| 120 minutes | <0.2 | <0.2 |

In the foregoing examples, rice hull ash was used or the biogenetic silica. Similar results are obtained when using ash from rice stalks, equisetum, bamboo palm leaves and polymra pollen ground into particles of from about 6 mesh to about 40 mesh.

As previously set forth and as exemplified by the drawings and examples given above, biogenetic silica devoid of fibers provides a porous skeletal support system in which liquids and gases may be pumped or flowed through it in such a manner to filter out particles of solids or liquids. The biogenetic silica should have a porosity of at least 50 percent. The irregular structure and noncompacting characteristics make biogenetic silica highly suitable for this purpose. The biogenetic silica particles do not break down when wet and remain dimensionally stable through a wide range of temperatures and pressures. The biogenetic silica particles may be formed into a porous cake on top of filter cloth and easily removed by back flushing when fully loaded with removed solids or liquids. By activating the carbon content in the silica ash, the filter medium can be used similar to charcoal baths to clarify organic liquids or to remove hydrocarbon gases from other gases. Similarly, the use of water swellable polymers permits the removal of liquids from gases and other liquids.

The loss due to friction from flow of liquids or gases through the biogenetic silica filter medium is minimal. Its unique pore size and total porosity allows it to remove particles down to about 1 micron in diameter compared to sand filters which only remove particles down to about 40 microns in diameter.

Biogenetic silica ash particles ranging in size from 6 to 40 mesh provide good results. Also, the biogenetic silica ash particles can be pelletized with suitable binders, such as fatty acid type and polymer type binders, or prilled with conventional prilling agents suitable for the conditions of use, such as ureaformaldehyde, other resins, and the like.

Accordingly, the present invention is well suited and adapted to attain the objects and ends and has the advantages and features mentioned as well as others inherent therein.

While presently preferred examples and embodiments of the invention have been given for the purposes of disclosure, changes can be made therein which are within the spirit of the invention as defined by the scope of the appended claims.

What is claimed is:

1. A filter medium for filtering fluid comprising,
   a closed container having an inlet and an outlet,
   biogenetic silica having a porosity of at least 50 percent by volume disposed in the closed container, and
   the inlet and the outlet arranged to direct flow of the fluid through the biogenetic silica.

2. A filter medium for filtering fluid comprising,
   a closed container having an inlet and an outlet, biogenetic silica having a porosity of at least 50 percent by volume disposed in the closed container,
the inlet and outlet arranged to direct flow of the fluid through the biogenetic silica, and
up to about 2 percent by weight of a water-swellable polymer dispersed throughout the biogenetic silica.

3. A filter medium for filtering fluid comprising,
a closed container having an inlet and an outlet,
biogenetic silica having a porosity of at least 50 percent by volume disposed in the closed container,
the inlet and the outlet arranged to direct flow of the fluid through the biogenetic silica, and
activated carbon coating the biogenetic silica.

4. A filter medium for filtering fluid comprising,
a closed container having an inlet and an outlet,
rice hull devoid of fiber having a porous silicon skeleton in amorphous state disposed in the closed container, and
the inlet and outlet arranged to direct flow of the fluid through the rice hull ash.

5. A filter medium for filtering fluid comprising,
a closed container having an inlet and an outlet,
rice hull ash devoid of fiber having a porous silicon skeleton amorphous state disposed in the closed container,
up to about 2 percent by weight of a water-swellable polymer dispersed throughout the rice hull ash, and
the inlet and the outlet arranged to direct flow of the fluid through the rice hull ash.

6. A filter medium for filtering fluid comprising,
a closed container having an inlet and an outlet,
rice hull ash devoid of fiber having a porous silicon skeleton in amorphous state disposed in the closed container,
activated carbon coating the rice hull ash, and
the inlet and the outlet arranged to direct flow of the fluid through the rice hull ash.

7. A filter medium comprising,
a porous filter cartridge having inner and outer body layers of relatively coarse and fine mesh, and
biogenetic silica having a porosity of at least 50 percent by volume contained by the filter cartridge,
impurities in fluid flowing through the cartridge being filtered from the fluid by the biogenetic silica.

8. A filter medium comprising,
a porous filter cartridge having inner and outer body layers of relatively coarse and fine mesh,
biogenetic silica having a porosity of at least 50 percent by volume contained by the filter cartridge, and
up to about 2 percent by weight of a water-swellable polymer dispersed throughout the biogenetic silica,
impurities in fluid flowing through the cartridge being filtered from the fluid by the biogenetic silica.

9. A filter medium comprising,
a porous filter cartridge having inner and outer body layers of relatively coarse and fine mesh,
biogenetic silica having a porosity of at least 50 percent by volume contained by the filter cartridge, and
activated carbon coating the biogenetic silica,
impurities in fluid flowing through the cartridge being filtered from the fluid by the biogenetic silica.

10. A filter medium comprising,
a porous filter cartridge having inner and outer body layers of relatively coarse and fine mesh,
rice hull ash devoid of fiber having a porous skeleton and in amorphous state contained by the filter cartridge,
impurities in fluid flowing through the cartridge being filtered from the fluid by the rice hull ash.

11. A filter medium comprising,
a porous filter cartridge having inner and outer body layers of relatively coarse and fine mesh,
rice hull ash devoid of fiber having a porous skeleton and in amorphous state contained by the filter cartridge,
up to about 2 percent by weight of a water-swellable polymer dispersed throughout the rice hull ash,
impurities in fluid flowing through the cartridge being filtered from the fluid by the rice hull ash.

12. A filter medium comprising,
a porous filter cartridge having inner and outer body layers of relatively coarse and fine mesh,
a rice hull ash devoid of fiber having a porous skeleton and in amorphous state contained by the filter cartridge, and
activated carbon coating the rice hull ash,
impurities in fluid flowing through the cartridge being filtered from the fluid by the rice hull ash.

13. A filter for removing impurities in fluid comprising,
a body,
a filter medium in the body comprised of biogenetic silica having a porosity of at least 50 percent by volume, and
means for flowing the fluid into the body through the filter and out of the body,
the filter being effective to filter the impurities from the body.

14. A filter for removing impurities in comprising,
a body,
a filter medium in the body comprised of biogenetic silica having a porosity of at least 50 percent by volume,
up to about 2 percent by weight of a water swellable polymer dispersed throughout the biogenetic silica, and
means for flowing the fluid into the body, through the filter and out of the body,
the filter being effective to filter the impurities from the fluid.

15. A filter for removing impurities in fluid comprising,
a body,
a filter medium in the body comprised of biogenetic silica having a porosity of at least 50 percent by volume,
activated charcoal coating the biogenetic silica, and
means for flowing the fluid into the body through the filter and out of the body,
the filter being effective to filter the impurities from the fluid.

16. A filter for removing impurities in fluid comprising,
a body,
a filter medium in the body comprised of rice hull ash devoid of fiber having a porous skeleton and in amorphous state, and
means for flowing the fluid into the body, through the filter and out of the body, the filter being effective to filter the impurities from the fluid.

17. A filter for removing impurities in fluid comprising,
 a body,
 a filter medium in the body comprised of rice hull ash devoid of fiber having a porous skeleton and in amorphous state,
 up to about 2 percent by weight of a water-swellable polymer dispersed throughout the rice hull ash, and
 means for flowing the fluid into the body, through the filter and out of the body,
 the filter being effective to filter the impurities from the body.

18. A filter for removing impurities in fluid comprising,
 a body,
 a filter medium in the body comprised of rice hull ash devoid of fiber having a porous skeleton and in amorphous state,
 activated charcoal coating the rice hull ash, and
 means for flowing the fluid into the body, through the filter and out of the body,
 the filter being effective to filter the impurities from the body.

19. A method of filtering impurities from fluid comprising,
 flowing the fluid through the filter medium of claims 1, 2, 3, 4, 5, 6, 7, 8, 9, 10, 11, 12, 13, 14, 15, 16, 17, or 18.

20. A method of filtering water from fluid comprising,
 flowing the fluid through the filter medium of claims 2, 5, 8, 11, 14, or 17.

21. A method of filtering liquids from gas comprising,
 flowing the gas through the filter medium of claims 3, 6, 9, 12, 15, or 18.

22. The filter medium of claims 1, 2, 3, 7, 8, 9, 13, 14, or 15 where,
 the biogenetic silica is one of pelleted and prilled.

23. The filter medium of claims 4, 5, 6, 10, 11, 12 16, 17, or 18 where,
 the rice hull ash is one of pelleted and prilled.

* * * * *

UNITED STATES PATENT OFFICE
CERTIFICATE OF CORRECTION

Patent No. 4,645,605          Dated February 24, 1987

Inventor(s) Robert L. Durham

It is certified that error appears in the above-identified patent and that said Letters Patent are hereby corrected as shown below:

Column 3, line 67, after "upon" insert --which--.

Column 4, line 21, "course" should read --coarse--.

Column 4, line 48, "asperator," should read --aspirator,--.

Column 4, line 67, "asperation" should read --aspiration--.

Column 6, line 12, "or" should read --for--.

Column 7, line 16, after "hull" insert --ash--.

Column 7, line 24, after "skeleton" insert --in--.

Column 8, line 38, (the first line of Claim 14), after "impurities in" insert --fluid--.

Column 10, line 20, "12" should read --12,--.

Signed and Sealed this

Twenty-fifth Day of August, 1987

*Attest:*

DONALD J. QUIGG

*Attesting Officer*     Commissioner of Patents and Trademarks